(No Model.)
H. W. GAZLAY.
MILK COOLER AND AERATOR.
No. 521,648. Patented June 19, 1894.
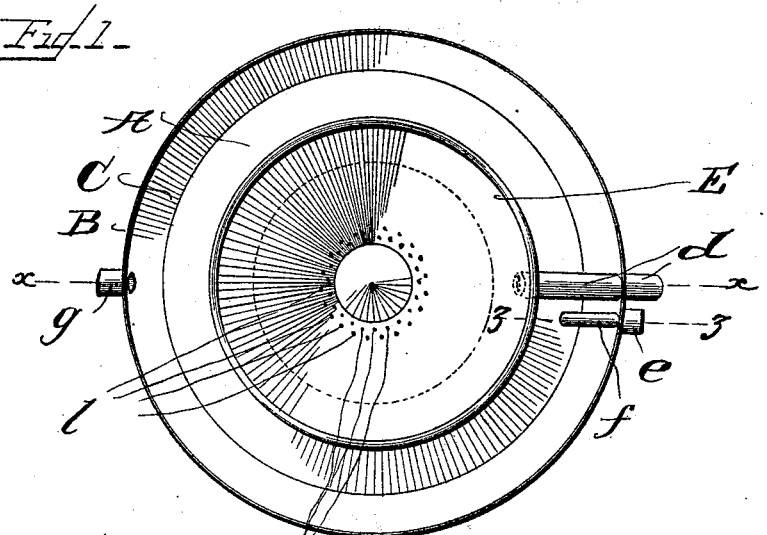
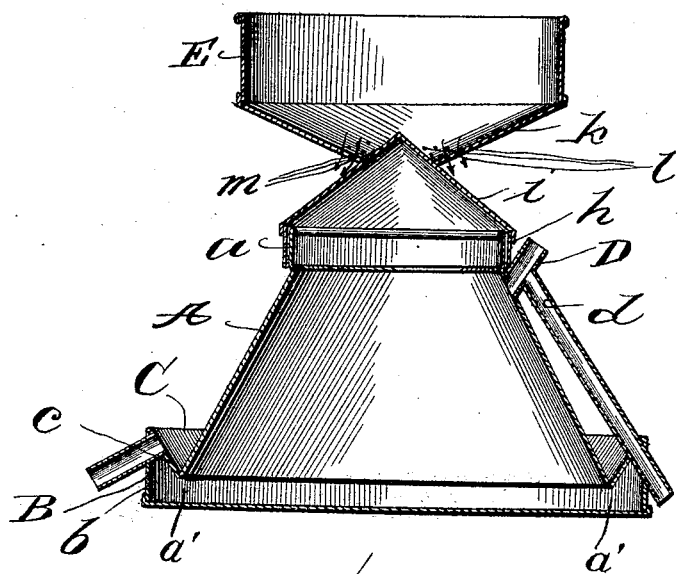
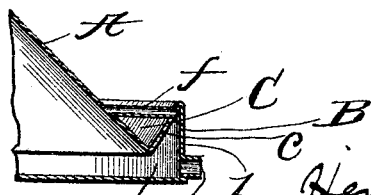
Witnesses
Inventor
Henry W. Gazlay.
By D. C. Reinohl.
Attorney

UNITED STATES PATENT OFFICE.

HENRY W. GAZLAY, OF CORTLAND, ASSIGNOR OF ONE-HALF TO PHILO B. SPAULDING, OF NEW HARTFORD, NEW YORK.

MILK COOLER AND AERATOR.

SPECIFICATION forming part of Letters Patent No. 521,648, dated June 19, 1894.

Application filed April 23, 1894. Serial No. 508,583. (No model.)

*To all whom it may concern:*

Be it known that I, HENRY W. GAZLAY, a citizen of the United States, residing at Cortland, in the county of Cortland and State of New York, have invented certain new and useful Improvements in Milk Coolers and Aerators; and I do hereby declare the following to be a full, clear, and exact description of the invention, such as will enable others skilled in the art to which it appertains to make and use the same.

My invention relates to devices for cooling, aerating and deodorizing liquids and has especial reference to that class of devices used for treating milk to relieve it of the animal heat and the odor due to the food on which the animal may have fed, and has for its object certain improvements in construction which will be fully disclosed in the following specification and claims.

In the accompanying drawings, which form part of this specification, Figure 1 represents a top plan view of my improved device; Fig. 2 a vertical section on line $x\ x$, and Fig. 3, a like section on line $y\ y$.

Reference being had to the drawings and the letters thereon, A indicates a conical cooling vessel or chamber provided at its upper end with a vertical collar $a$ to receive a corresponding flange on the lower end of the milk-reservoir and secure the latter to the former against accidental displacement.

B indicates a supplemental annular cooling chamber which surrounds the lower end of the primary cooler, communicates therewith through a narrow annular passage $a'$ exaggerated in the drawings and is provided with a vertical outer wall $b$ and with an inwardly and downwardly inclined inner wall $c$ which in conjunction with the angular wall of the vessel A forms an annular V shaped receptacle C for partially cooled milk as it flows down over the outer surface of the vessel A, and both of its sides or walls are exposed to the cooling medium within the cooling chambers A and B.

D indicates primarily a vent pipe for the escape of air that becomes heated from warm milk flowing over the outer surface of the wall of the vessel, and communicating with the pipe D is a pipe $d$ to conduct off the water resulting from the melted ice, or it may serve as an overflow or discharge pipe when water is used as a cooling medium. The contents of the cooling vessel in the form of water or other liquid are drawn off or discharged through pipe $e$ communicating with the lower part of the cooling vessel.

When ice is used as a cooling medium it is supplied through the open upper end of the vessel A, and when water is employed it may be supplied under pressure through pipe $e$ and discharged through pipe $d$ or the water may be supplied through pipe D, by closing the lower end of pipe $d$ and be discharged through pipe $e$. In the latter system of introducing the water the cold water is brought into contact first with that part of the cooling chamber with which the warm milk first comes in contact, thereby getting from the water its greatest degree of efficiency as a cooling agent. To secure circulation of the water in the secondary or supplemental cooling chamber B, said chamber is connected at its upper end or at the apex thereof with the chamber A, by a pipe $f$; this pipe also affords a means of escape for air from said chamber B into chamber A.

The milk is discharged from receptacle C through a pipe $g$ which communicates with the upper part of said receptacle, thereby causing the milk to rise in the receptacle and be exposed to the cooling medium the whole time from its contact with the inclined surface $i$ at the upper end of chamber A until it is discharged from receptacle C.

It is obvious that air at a low degree of temperature may be admitted to the cooling chamber and circulated through the chamber with good results as a cooling medium.

E indicates the milk-reservoir and is provided with a vertical flange $h$ which fits over the collar $a$ of the vessel A and secures the reservoir to the vessel A, and with an inclined surface $i$ with which the milk flowing from the reservoir first comes in contact and on which it spreads out into a thin sheet or film.

The reservoir E is provided with a conical wall $k$ which is inclined opposite to the incline of the spreading surface $i$ so that the apices of the two truncated cones meet and form a narrow space through which the milk passes in streams before it is spread into a sheet on the surface $i$ thereby preventing the milk becoming blown away from the cooler when subject to high wind, as frequently occurs when the milk is required to fall a considerable distance before striking a spreading surface. In the conical wall $k$ of the reservoir and near the apex thereof is formed a series of perforations $l$, preferably in a circle, and below said series $l$ is another series of perforations $m$ through both of which the milk is discharged in fine streams and falls upon the conical surface $i$ near its apex and is then spread into a thin sheet or film, in which form the milk flows down over the outer surface of the cooling vessel A and is cooled by the medium in the vessel, and thoroughly aerated and deodorized by contact with the atmosphere while passing from the reservoir to the discharge pipe of the receptacle C.

Having thus fully described my invention, what I claim is—

1. In a milk-cooler, a primary cooling-chamber having a conical wall, an annular and supplemental cooling chamber surrounding the lower end of the primary chamber and in communication therewith, and an annular milk receptacle intermediate said cooling chambers, in combination with a milk-reservoir provided with perforations through which the milk is discharged.

2. In a milk-cooler a primary cooling-chamber having a conical wall, an annular and supplemental cooling chamber surrounding the lower end of the primary chamber and communicating therewith at the bottom and top of said secondary chamber and having an inwardly and downwardly inclined inner wall, and an annular V shaped milk receptacle intermediate said chambers, in combination with a milk-reservoir provided with perforations through which the milk is discharged.

HENRY W. GAZLAY.

Witnesses:
   B. T. WRIGHT,
   C. J. BROWN.